United States Patent
Kraus et al.

(10) Patent No.: US 9,810,340 B2
(45) Date of Patent: Nov. 7, 2017

(54) DEVICE FOR OPENING OR CLOSING A SEAL SET OF A VALVE

(71) Applicant: Astrium GmbH, Taufkirchen (DE)

(72) Inventors: Stephan Kraus, Oedheim (DE); Thomas Maier, Lauffen (DE); Markus Wolf, Mannheim (DE)

(73) Assignee: Astrium GmbH, Taufkirchen (DE)

(*) Notice: Subject to any disclaimer, the term of this patent is extended or adjusted under 35 U.S.C. 154(b) by 85 days.

(21) Appl. No.: 14/339,953

(22) Filed: Jul. 24, 2014

(65) Prior Publication Data
US 2015/0028234 A1    Jan. 29, 2015

(30) Foreign Application Priority Data

Jul. 25, 2013   (DE) .................. 10 2013 012 377

(51) Int. Cl.
| | | |
|---|---|---|
| F16K 11/048 | (2006.01) | |
| F16K 31/02 | (2006.01) | |
| F03G 7/06 | (2006.01) | |
| B64G 1/40 | (2006.01) | |
| F02K 9/58 | (2006.01) | |

(52) U.S. Cl.
CPC ............ *F16K 31/025* (2013.01); *B64G 1/402* (2013.01); *F02K 9/58* (2013.01); *F03G 7/065* (2013.01); *F16K 11/048* (2013.01); *F05D 2220/60* (2013.01); *F05D 2300/505* (2013.01)

(58) Field of Classification Search
CPC ......... F16K 11/048; F16K 31/025; F02K 9/58
USPC .............................................. 251/11, 129.07
See application file for complete search history.

(56) References Cited

U.S. PATENT DOCUMENTS

| | | | | |
|---|---|---|---|---|
| 4,068,820 A | * | 1/1978 | Pimentel | F03G 7/065 251/11 |
| 4,757,840 A | * | 7/1988 | Chmelar | F16K 11/07 137/269 |
| 5,211,371 A | * | 5/1993 | Coffee | F16K 31/002 251/11 |
| 5,586,721 A | | 12/1996 | Humburg | |
| 7,140,391 B2 | * | 11/2006 | Eberhardt | F16K 11/044 137/625.48 |
| 7,225,831 B2 | * | 6/2007 | Hope | F16K 15/025 137/516.27 |

(Continued)

FOREIGN PATENT DOCUMENTS

| | | |
|---|---|---|
| DE | 44 46 152 C2 | 2/2000 |
| DE | 603 08 538 T2 | 1/2007 |

(Continued)

OTHER PUBLICATIONS

German Office Action dated Jun. 30, 2014 (ten (10) pages).

(Continued)

*Primary Examiner* — Seth W Mackay-Smith
(74) *Attorney, Agent, or Firm* — Crowell & Moring LLP

(57) ABSTRACT

A device for opening or closing a seal seat of a valve arranged in a pipe for liquid or gaseous media includes a one-time only activation of the valve using a shape memory actuator. The shape memory actuator changes its external shape abruptly when a transformation temperature is reached that is dependent upon its alloy composition. The transformation temperature can be generated by a controllable electrical heating device of the device.

12 Claims, 1 Drawing Sheet

(56) References Cited

U.S. PATENT DOCUMENTS

| | | | |
|---|---|---|---|
| 8,096,119 B2* | 1/2012 | Baughman | F03G 7/005 148/402 |
| 8,448,446 B2* | 5/2013 | Mons | F01D 17/14 251/11 |
| 9,038,983 B2* | 5/2015 | Kollar | F16K 31/025 251/11 |
| 2005/0173661 A1* | 8/2005 | Mignon | F16K 31/002 251/11 |
| 2008/0251044 A1 | 10/2008 | Riley et al. | |
| 2011/0024653 A1* | 2/2011 | Huber | E21B 47/18 251/11 |
| 2011/0315903 A1* | 12/2011 | Sohn | F03G 7/065 251/11 |
| 2012/0199763 A1* | 8/2012 | Lind | F16K 31/025 251/11 |

FOREIGN PATENT DOCUMENTS

| | | |
|---|---|---|
| DE | 10 2007 038 641 A1 | 2/2009 |
| DE | 10 2008 063 534 A1 | 7/2010 |
| DE | 10 2009 021 337 A1 | 1/2011 |
| EP | 2 743 552 A1 | 6/2014 |
| JP | 2013-79660 A | 5/2013 |

OTHER PUBLICATIONS

German Office Action dated Oct. 24, 2014 (four (4) pages).
European Search Report dated Nov. 25, 2014, with partial English translation (eight (8) pages).

* cited by examiner

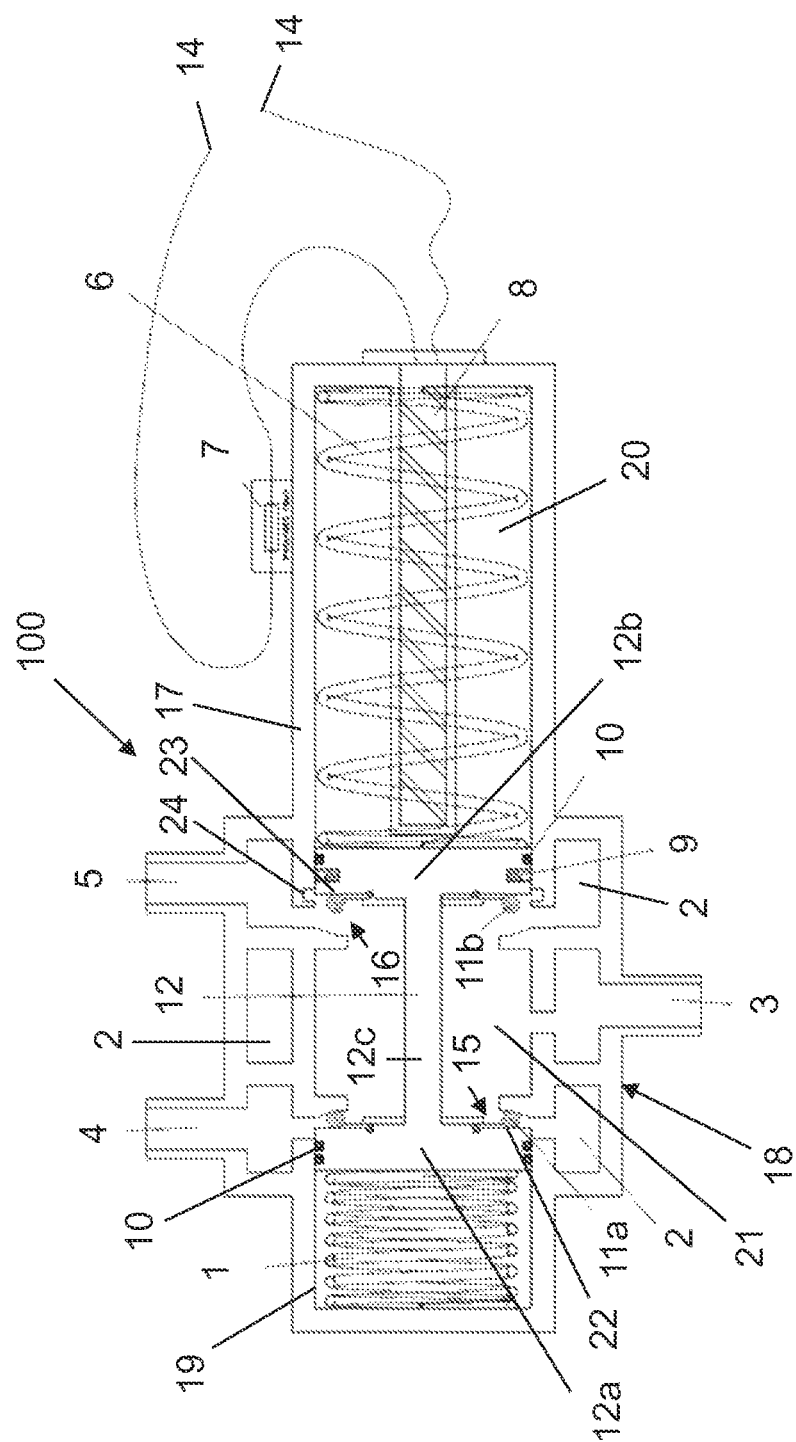

DEVICE FOR OPENING OR CLOSING A SEAL SET OF A VALVE

CROSS-REFERENCE TO RELATED APPLICATIONS

The present application claims priority under 35 U.S.C. §119 to German patent application number 10 2013 012 377.1, filed Jul. 25, 2013, the entire disclosure of which is herein expressly incorporated by reference.

BACKGROUND AND SUMMARY OF THE INVENTION

Exemplary embodiments of the invention relate to a device for opening or closing a seal seat of a valve, which is provided for arrangement in a pipe for liquid or gaseous media.

Valves are used, for example, where a pipe for liquid or gaseous media is to be opened or closed. In the closed condition of the valve, a very limited leakage rate must be ensured by the valve. Depending upon the application the valves can be provided for multiple or also only for single actuation, the latter being the case for example in drive systems for space travel applications.

In technical systems a distinction is made between Normally Open (NO) and Normally Closed (NC). The designation elates to the switching state before actuation. For example a NO valve is closed upon actuation.

In the case of space travel applications high standards are set for the reliability of the activation, since a malfunction can cause substantial damage or even the loss of the drive system.

Exemplary embodiments of the present invention are directed to a structurally and/or functionally reliable device for opening or closing a fluid line as well as a corresponding drive system for space travel applications.

In a device for opening or closing a seal seat of a valve that is provided for arrangement in a pipe for liquid or gaseous media, according to the invention a shape memory actuator is provided for once-only activation of the valve, the memory actuator changes its external shape abruptly when a transformation temperature is reached which is dependent upon its alloy composition. The transformation temperature can be generated by a controllable electrical heating device of the device.

The use of a shape memory actuator enables the once-only and irreversible activation of the valve. The activation takes place by heating the shape memory actuator using the energy supplied from the exterior, i.e. the heating device, so that the actuator changes in size abruptly and as thereby irreversibly changes the current open or closed state of the valve. This operating function can be provided with great reliability. For operation of the valve no further elements are necessary in addition to the shape memory actuator and the heating device, so that the device has a simple mechanical structure. The device can be produced with few components. The device can be provided with a low weight.

The valve may comprise a piston disposed in a distribution compartment and which, depending upon whether the valve is opened (NO) or closed (NC) without activation of the shape memory actuator, is or is not pressed by a spring against the seal seat, wherein the shape memory actuator generates a force directed counter to the spring on the piston.

The piston can be released from the seal seat or pressed onto the seal seat by the activation of the shape memory actuator depending upon whether the valve is opened or closed without activation of the shape memory actuator. Thus, the piston is moved by the actuation of the shape memory actuator. For this purpose when the transformation temperature is reached the shape memory actuator generates a force which is greater than the force generated by the spring in order to move the piston.

The force of the shape memory actuator, i.e. the force applied by the shape memory actuator to the piston, corresponds in the non-activated state to the force generated by the spring. In other words, there is a balance of forces, so that the valve—according to the constructive configuration—is either in the condition NO (normally open) or NC (normally closed). In the non-activated state the shape memory actuator has its so-called "cold" structural state.

The movement of the piston is only dependent upon the balance of forces of the spring and the shape memory actuator. This can be achieved, for example, by the spring and the shape memory actuator, lying for example in a common axis, being disposed on opposing sides of the piston.

The shape memory actuator may have a spiral shape and the heating device may be disposed in the interior of the spiral shape memory actuator. This enables fast heating of the material of the shape memory actuator in the event of the heating device is activated. A uniform heating of the material of the shape memory alloy is achieved until the transformation temperature is reached. For reasons of redundancy the heating device can also be implemented by a plurality of heating elements.

The distribution compartment can be coupled to at least two connections, so that the liquid or gaseous medium can flow through a connection into the distribution compartment and the liquid or gaseous medium can flow through another connection out of the distribution compartment if the valve is opened.

The seal seat can be formed by a metal seal, which in the sealed state is pressed against a counterpart. The metal seal can be formed in particular from a ductile material that is plastically deformable when pressed against the counterpart. In this way a low leakage rate can be ensured before actuation for a NC (normally closed) valve or after actuation for a NO (normally open) valve.

The heating device can comprise a safety device that deactivates the heating device after the transformation temperature of the shape memory actuator is exceeded. As a result after the operation of the valve damage by the heating device due to excessively high temperatures can be prevented. The switching off of the heating device is also ensured when an activation for a switching element or the switching element for the heating circuit itself are defective.

The valve is constructed so that it is rotationally symmetrical with respect to the components that are necessary for the sealing function. This results in a simple and space-saving construction of the device.

The valve can comprise three connections and two seal seats, wherein one of the connections is closed by a dummy cap. As a result, depending upon which connection is closed by the dummy cap, a NO (normally open) or NC (normally closed) function can be implemented as required. Such a device can be used flexibly, since at the time of production it is not yet necessary to fix the function (NO or NC).

To summarize, in the present invention a valve is activated with a one-way effect shape memory actuator. The shape memory actuator in a suitable configuration changes its external shape abruptly when a transformation temperature dependent upon the alloy composition is reached. The strong forces released in this case are used for the opening and closing of a metal seal seat. The transformation temperature is reached by means of an electrical heating device. The valve can be designed to be actuated once precisely, and in its field of use it is similar to a pyrotechnic valve.

Furthermore a drive system for a space travel application is proposed, which has at least one device of the type described above. The drive system has the same advantages as those mentioned in connection with the device described above.

BRIEF DESCRIPTION OF THE DRAWING FIGURE

The invention is described in greater detail below with reference to a first embodiment in the drawings.

FIG. 1 shows a device according to the invention with a valve, of which the "switching state" can be changed only once by a shape memory actuator.

DETAILED DESCRIPTION

FIG. 1 shows a device according to the invention with a valve 100, of which the "switching state" can be changed only once by a shape memory actuator 6.

The valve can be used, for example, in drive systems for space travel applications, for example in order to separate one or more tanks with pressurizing gas from fuel tanks in satellites and space probes. For this purpose the valve 100 must be closed in a non-actuated (activated) state. This state s designated as "normally closed" (NC). The valve can also be used to separate off a fuel supply to a propulsion unit if this is no longer required. For this use the valve must be open in the non-actuated state. This state is designated as "normally open" (NO). The example shown in FIG. 1 has both the NO (normally open) and the NC (normally closed) functionality. In principle the invention can also be implemented with such a valve 100, which is designed to allow only one or the other functionality.

The device shown in FIG. 1 consists in principle of two sub-assemblies, namely the valve 100 with two metal seal seats 15, 16 and a heating device 8. The valve 100 has a housing 17 formed rotationally symmetrically around a central axis. The housing 17 has an increased diameter in a central section 18 disposed relative to the longitudinal extent of the central axis. Distribution compartments 2 are disposed in this region and extend around the cylindrical wall of the housing 17. The device shown in FIG. 1 can be used as "normally open" (NO), i.e. opened non-actuated or without activation, or "normally closed" (NC), i.e. closed non-actuated or without activation.

The decision as to the configuration (NO or NC) in which the device is used can be made after production and takes place by corresponding "wiring" of three connections 3, 4 and 5 provided in the embodiment. Each of the connections 3, 4, 5 is formed in the central section 18 as connecting pieces extending radially in relation to the central axis. The connections 3, 4, 5 are in each case connected in terms of flow technology to associated distribution compartments 2. Two of the three connections 3, 4, 5 are connected to a respective pipe (not shown).

If the device is configured as "normally closed" (NC), then, for example, the connection 3 constitutes the outlet and is to be connected to a corresponding outlet pipe. The connection 4 constitutes the inlet and is to be connected to a corresponding inlet pipe. The connecting 5 is connected to a dummy cap (not shown).

If the device is to be configured as "normally open" (NO), then for example the connection 5 constitutes the inlet and is to be connected to a corresponding inlet pipe. The connection 3 constitutes the outlet and is to be connected to a corresponding outlet pipe. The connection 4 is connected to a dummy cap (not shown).

A piston 12, which can be moved in the direction of the central axis of the valve 100, is disposed in the interior of the housing 17 in the region of the central section 18. The piston 12 consists of two piston plates 12a, 12b disposed in parallel and are rigidly connected to one another by means of a rod 12c, which extends in the direction of the central axis of the housing 17. As a result a volume 21 through which the medium can flow is formed between the piston plates 12a, 12b when the valve 100 is opened. Each of the piston plates 12a, 12b has a piston base which face one another and, when the valve 100 is opened, is in contact with the gaseous or liquid fluid. The volume 21 present between the piston bases is dependent upon the length of the rod 12c as well as the surface of the piston plates 12a, 12b or the piston bases. On the side faces of the piston plates 12a, 12b bordering on the housing 17, at least one shaft seal 10 is provided in each case completely surrounding the respective piston plate 12a, 12b and seals the volume relative to spring compartments 19, 20 described below.

A first spring compartment 19 in which a spring 1 is disposed is formed between the piston 12a (i.e. the piston base facing away from the volume 21) and the housing 17. In a corresponding manner a second spring compartment 20 in which a shape memory actuator 6 is disposed is formed between the piston 12b (i.e. the piston base facing away from the volume 21) and the housing 17. Thus the piston 12 is disposed in the housing 17 between the spring compartments 19, 20. The spring 1 is disposed in the first spring compartment 19 in such a way that it generates a force acting in the direction of the central axis, the force acting on the piston 21 and attempting to enlarge the volume of the spring compartment 19. In other words the spring 1 exerts a force acting on the piston 12 in the direction of the second spring compartment 20. The spring 1 may, for example, be a helical spring. When the shape memory actuator 6 has a cold structural state (i.e. is not "activated") it exerts an opposing force acting counter to the spring force of the spring 1. In the non-actuated case, if the shape memory actuator has its cold structural state, the spring 1 and the shape memory actuator 6 are in a balance of forces and the salve piston assumes the position illustrated in FIG. 1.

In this position the piston plate 12a is pressed against the seal seat 15 by the spring force of the spring 1. The seal seat 15 is formed by a metal seal 11a, which is based on the plastic deformation of a ductile metal relative to a hard counterpart, and a stop 22 against which the seal 11a is pressed. The ductile material of the metal seal 11a is disposed as an annular bead on the piston plate 12a and is pressed by the spring force of the spring 1 against the stop 22, which is associated with the piston plate 12a and is formed by an annular projection protruding into the volume 21. As a result the distribution compartment connected to the connection 4 is separated from the volume 21.

A further seal seat 16 is formed by a metal seal 11b and a stop 23. The metal seal 11b is disposed as an annular bead on the piston plate 12b. The stop 23 is associated with the piston plate 12b and is formed by an annular projection protruding into the volume 21. When the seal seat 15 is in the sealing position illustrated in FIG. 1, the seal seat 16 is opened, so that the distribution compartment 2 connected to the connection 5 is connected in terms of flow technology to the volume 21. The metal seals 11a, 11b enable a limited leakage, based upon the plastic deformation of the ductile metal relative to the hard counterpart, i.e. the stop 22, 23.

The movement of the piston 12 is dependent only upon the balance of forces of the spring 1 and the shape memory actuator 6, but not upon the internal pressure inside the valve 100. If a suitable electrical voltage is applied to cable ends 14 of the electrical heating device 8, the temperature of the shape memory actuator 6 rises up to the so-called transition temperature (also designated as the transformation temperature) and the shape memory actuator 6 exerts a force on the piston 12. The force generated by the shape memory actuator 6 when the trans on temperature is reached is greater than the force applied by the spring 1 to the piston 12. This force pushes piston 12 to the left until the seal seat 16 seals the volume 21 relative to the distribution compartment 2 connected to the connection 2. At the same time the seal seat 15 is in a position in which it no longer forms a seal. The transformation temperature is solely dependent upon the alloy composition of the shape memory actuator 6.

An engaging mechanism 9, which may for example be spring-loaded, ensures that any further movement of the piston 12 is impossible. For this purpose the engaging mechanism has for example spring-loaded pins which are introduced in the region of the side face of the piston plate 12b and are moved into corresponding grooves 24 of the housing 17 as soon as the seal seat 16 is reached. In this state a plastic deformation of the seal 11b is achieved.

When the transformation temperature is exceeded a thermal fuse 7 cuts the current circuit, so that the shape memory actuator 6 is no longer heated by the heating device 8.

In a configuration which is not illustrated the valve can have only two connections and associated distribution compartments. In this configuration even one single seal seat is sufficient. Such a valve may be provided as a NO (normally open) or NC (normally closed) valve.

The device described above has a series of advantages and is distinguished in particular from pyrotechnically actuated valves currently in use by the following advantages:
- The device can be more easily dimensioned for different mass flows and pipe cross-sections.
- When the valve is actuated small quantities of particles are produced.
- The service life of shape memory actuators is not restricted in contrast to pyrotechnic detonators.
- The valve opens slowly by comparison with pyrotechnic valves with very small resulting hydraulic shocks.
- If the valve is used in a drive system, in particular a space craft drive system, the valve produces no or lower shock loads on the structure of the drive system when the valve is actuated than is the case with conventional pyrotechnically actuated valves.
- The valve does not constitute a hazardous material within the meaning of the Explosives Act. Thus no special training (certificate of competence in handling explosives) is necessary for handling thereof.
- The electrical activation enables a simpler activation by comparison with pyrotechnic valves.
- There are reduced requirements for storage of the components, for example in relation to a temperature range.

Thus by the advantages due to its design in contrast to the valves in use nowadays such in space travel applications the valve leads to considerable added value in a drive system, in particular in mission phases which are currently outside the useful life of pyrotechnic valves, for example in scientific missions or end of life.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 spring
2 distribution compartment
3 input/output
4 input/output
5 input/output
6 shape memory actuator
7 (thermal) fuse
8 heating device
9 engaging mechanism
10 shaft seal
11a seal
11b seal
12 piston
12a piston plate
12b piston plate
12c (piston) rod
13 sealing surface
14 cable end
15 first seal seat
16 second seal seat
17 housing
18 central section
19 spring compartment for spring 1
20 spring compartment for shape memory actuator 6
21 volume
22 stop
23 stop
24 groove
100 valve

What is claimed is:

1. A device, comprising:
a valve, which includes a seal seat and which is coupled to a pipe carrying liquid or gaseous media;
a shape memory actuator-configured to abruptly change its external shape when a transformation temperature dependent upon an alloy composition of the shape memory actuator is reached, wherein the shape change activates the valve and irreversibly activates an engaging mechanism into a state in which reverse activation of the valve is mechanically arrested; and
a controllable electrical heating device, which is configured to generate the transformation temperature,
wherein the seal seat is a metal seal that is pressed against a counterpart in a sealed state,
wherein the metal seal is formed from a ductile material that is plastically deformed when pressed against the counterpart, and
wherein the engaging mechanism activates as soon as the sealed state is reached.

2. The device of claim 1, wherein
the valve comprises a piston disposed in a distribution compartment,
the piston, depending upon whether the valve is opened or closed without activation of the shape memory actuator, is or is not pressed by a spring against the seal seat, and the shape memory actuator is configured to generate a force directed counter to the spring on the piston.

3. The device of claim 2, wherein the piston is released from the seal seat or is pressed onto the seal seat by the activation of the shape memory actuator depending upon whether the valve is opened or closed without activation of the shape memory actuator.

4. The device of claim 2, wherein the force of the shape memory actuator corresponds in a non-activated state to the force generated by the spring.

5. The device of claim 2, wherein movement of the piston is only dependent upon a balance of forces of the spring and the shape memory actuator.

6. The device of claim 2, wherein the distribution compartment is couplable to at least two connections so that the liquid or gaseous medium can flow through one of the at least two connections into the distribution compartment and the liquid or gaseous medium can flow through another of the at least two connections out of the distribution compartment if the valve is opened.

7. The device of claim 1, wherein the shape memory actuator has a spiral shape and the heating device is disposed in an interior of the spiral shape memory actuator.

8. The device of claim 1, wherein the heating device comprises a safety device configured to deactivate the heating device after the transformation temperature of the shape memory actuator is exceeded.

9. The device of claim 1, wherein the valve is rotationally symmetrical with respect to components necessary for sealing.

10. The device of claim 1, wherein the valve comprises three connections and two seal seats, wherein one of the three connections is closed by a dummy cap.

11. The device of claim 1, wherein the engaging mechanism includes a spring-loaded pin that engages a corresponding groove when the valve is activated by the shape change of the shape memory actuator.

12. The device of claim 1, wherein the engaging mechanism is disposed on a piston, and wherein the shape change of the shape memory actuator exerts a force on the piston and moves the engaging mechanism into contact with a corresponding groove, thereby activating the engaging mechanism.

* * * * *